(12) United States Patent
Bhattacharya et al.

(10) Patent No.: US 11,923,101 B2
(45) Date of Patent: Mar. 5, 2024

(54) OPTICAL TWEEZER PHONON LASER

(71) Applicants: Mishkatul Bhattacharya, Rochester, NY (US); Anthony Nickolas Vamivakas, Rochester, NY (US)

(72) Inventors: Mishkatul Bhattacharya, Rochester, NY (US); Anthony Nickolas Vamivakas, Rochester, NY (US)

(73) Assignees: Rochester Institute of Technology, Rochester, NY (US); University of Rochester, Rochester, NY (US)

( * ) Notice: Subject to any disclaimer, the term of this patent is extended or adjusted under 35 U.S.C. 154(b) by 474 days.

(21) Appl. No.: 17/320,708

(22) Filed: May 14, 2021

(65) Prior Publication Data

US 2021/0358651 A1 Nov. 18, 2021

Related U.S. Application Data

(60) Provisional application No. 63/024,884, filed on May 14, 2020.

(51) Int. Cl.
*G21K 1/00* (2006.01)
*G02B 27/28* (2006.01)
*G02F 1/01* (2006.01)

(52) U.S. Cl.
CPC .......... *G21K 1/006* (2013.01); *G02B 27/283* (2013.01); *G02F 1/0123* (2013.01)

(58) Field of Classification Search
CPC ...... G21K 1/006; G02B 27/283; G02F 1/0123

USPC .......................................................... 250/251
See application file for complete search history.

(56) References Cited

U.S. PATENT DOCUMENTS

| 7,133,203 | B2 | 11/2006 | Grier et al. |
| 7,612,355 | B2 | 11/2009 | Wu et al. |
| 10,459,212 | B2 * | 10/2019 | Tanner ................... G02B 21/32 |
| 2008/0020935 | A1 | 1/2008 | Volfson |
| 2021/0358651 | A1 | 11/2021 | Mishkatul |

FOREIGN PATENT DOCUMENTS

| CN | 210199398 U | 3/2020 |
| CN | 112366507 A | 2/2021 |
| WO | 2006116753 | 11/2006 |

OTHER PUBLICATIONS

Pettit et al, "An Optical Tweezer Phonon Laser," Nature Photonics 13:402-5 (2019).

(Continued)

*Primary Examiner* — Kiet T Nguyen
(74) *Attorney, Agent, or Firm* — Bond, Schoeneck & King, PLLC (57) ABSTRACT

An optical tweezer phonon laser system and method for modulating mechanical vibrations of an optically levitated mechanical oscillator to produce coherence is disclosed. A feedback loop is configured to simultaneously supply an electro-optic modulator with an amplification signal and a cooling signal representing an amplification force linear in the mechanical oscillator momentum and a cooling force nonlinear in the mechanical oscillator variable position and linear in the momentum, respectively controlling the intensity of a trap beam levitating the mechanical oscillator.

6 Claims, 8 Drawing Sheets

(56) References Cited

OTHER PUBLICATIONS

Bargatin et al., "Nanomechanical Analog of a Laser: Amplification of Mechanical Oscillations by Stimulated Zeeman Transitions," Physical Review Letters 91(13):1380201-04 (2003).
Vahala et al., "A Photon Laser," Nature Physics 5:682-6 (2009).
Zhang et al., "A Phonon Laser Operating at an Exceptional Point," 12:479-84 (2018).
Khurgin et al., "Laser-Rate-Equation Description of Optomechanical Oscillators," Physical Review Letters 108:223904 (2012).
Kemiktarak et al., "Mode Competition and Anomalous Cooling in a Multimode Phonon Laser," Physical Review Letters 113:030802 (2014).
Mahboob et al., "Phonon Lasing in an Electromechanical Resonator," Physical Review Letters 110:127202 (2013).
International Search Report and Written Opinion for International Patent Application No. PCT/US21/32444 (dated Mar. 28, 2021).
Knunz, "A Trapped-Ilon Phonon Laser and the Detection of Ultra-Weak Forces," Dissertation at the Faculty of Physics of the Ludwig Maximilian University, Munich (2010).
Lee et al., "Prototype of a Phonon Laser with Trapped Ions," Department of Physics and Center for Theoretical Physics, National Taiwan University (2020).

* cited by examiner

OPTICAL TWEEZER PHONON LASER

This application claims the benefit of the filing date of U.S. Provisional Patent Application No. 63/024,884 filed May 14, 2020, which is hereby incorporated by reference in its entirety.

This invention was made with government support under Grant Nos. N00014-17-1-2285; N00014-18-1-2370, Oracle Project No. 31928; N00014-14-1-0803; and N00014-17-1-2291, Oracle Project No. 31778 awarded by the Office of Naval Research. The government has certain rights in this invention.

FIELD

The present disclosure relates to an optical tweezer phonon laser system and method for producing coherent mechanical vibrations from an optically levitated mechanical oscillator.

BACKGROUND

Optically levitated nanoparticles are special in that they are highly isolated from the surrounding environment since they are not mechanically clamped or tethered to a support or substrate. The lack of environmental influences turns them into high quality oscillators which can be used for precision sensing close to, or potentially beyond, the limits imposed by quantum mechanics. To fully exploit these platforms, however, in addition to experiencing low decoherence, they need to display coherent dynamics.

Optical levitation techniques have existed since Art Ashkin's Nobel-prize winning demonstration in 1970; nanoparticle position measurement techniques have been refined for decades, especially by the biological physics community; and, optical feedback is a standard technology. However, there exists no prior technology for generating laser-like coherent motion for a levitated nanoparticle.

There is precedent for phonon lasers at the atomic level, namely, using a single Magnesium ion contained in an electrodynamic trap. But such phonon lasers rely on the existence of optically addressable internal structure in the mechanical oscillator and work only at the atomic scale. The art lacks a phonon laser where the mechanical oscillator does not have to be an atom, nor is the presence of any internal structure required.

There is also precedent for phonon lasers using mechanically clamped lasers. But those rely on resonances provided by optical cavities. The art lacks a phonon laser which does not require the use of any such cavities, nor mechanically clamped oscillators, which are typically subject to considerable environmental disturbances.

Finally, there is precedent in solid state physics where phonon lasers involve phonons arising from the interactions of oscillating atoms arranged in an array in a solid. The art lacks a phonon laser which does not rely on such interactions.

SUMMARY

In accordance with one aspect of the present invention, there is provided a single-beam optical tweezer phonon laser including:
  a trap beam and a probe beam in optical communication with a first polarizing beam splitter configured to provide a single collinear beam without interference between the trap beam and probe beam;
  a second polarizing beam splitter configured to isolate the probe beam from the trap beam;
  a first focusing lens;
  a second focusing lens;
  a mechanical oscillator trap disposed between the first and second focusing lenses, wherein the lenses are disposed between the beam splitters, and the lenses, beam splitters and trap are in optical alignment with the single beam;
  a beam dump downstream of the beam splitters and in optical alignment with the trap beam;
  a detector in optical communication with the isolated probe beam configured to provide position information of a mechanical oscillator levitated within the mechanical oscillator trap;
  an electro-optic modulator controlling the intensity of the trap beam; and
  a feedback loop in electrical communication with the electro-optic modulator and the detector, wherein the feedback loop is configured to simultaneously supply an amplification signal and a cooling signal representing respectively an amplification force linear in the mechanical oscillator momentum and a cooling force nonlinear in the mechanical oscillator variable position and linear in the momentum generated from the position information to the electro-optic modulator to generate coherent motion of the mechanical oscillator.

In accordance with another aspect of the present disclosure, there is provided a method for modulating mechanical vibrations to produce coherence from an optically levitated mechanical oscillator, including:
  combining a trap beam with a probe beam to form a single collinear beam without interference between the trap beam and the probe beam;
  focusing the single beam in a trap, levitating a mechanical oscillator in the trap beam and illuminating the mechanical oscillator with the probe beam;
  isolating the probe beam from the trap beam downstream from the trap;
  collecting light from the isolated probe beam scattered by the mechanical oscillator and interfering the scattered light with unscattered light from the probe beam yielding position information of the mechanical oscillator;
  generating an amplification force linear in the mechanical oscillator momentum and a cooling force nonlinear in the mechanical oscillator variable position and linear in the momentum from the position information;
  simultaneously supplying an amplification signal and a cooling signal representing the generated amplification force and cooling force to an electro-optic modulator; and
  modulating the intensity of the trap beam with the electro-optic modulator from the simultaneously supplied amplification signal and a cooling signal to generate coherent motion of the mechanical oscillator.

These and other aspects of the present disclosure will become apparent upon a review of the following detailed description and the claims appended thereto.

BRIEF DESCRIPTION OF THE DRAWINGS

FIG. 2C is a graph showing second-order phonon autocorrelation function.

DETAILED DESCRIPTION

The present disclosure relates to a single-beam optical tweezer phonon laser and method for modulating mechanical vibrations to produce coherence from an optically levitated mechanical oscillator. A trap beam is combined collinearly with a probe beam to form a single beam without significant interference between the two beams. For example, the trap beam can be polarized orthogonally to the probe beam by a polarizing beam splitter. The single beam is focused in a trap wherein the trap beam levitates the mechanical oscillator and the probe beam illuminates the mechanical oscillator. For example, the single beam can be focused using a parabolic mirror or an optical lens, e.g., a high numerical aperture optical lens. The probe beam is isolated from the trap beam downstream from the trap. For example, the focused single beam can be unfocused by using an optical lens, e.g., a high numerical aperture optical lens and the trap beam can be separated by a polarizing beam splitter to a beam dump. A detector collects the light scattered from the isolated probe beam by the mechanical oscillator and interferes the scattered light with unscattered light from the probe beam. This interference (homodyne measurement) yields the displacement of the mechanical oscillator, as it oscillates, along all three Cartesian directions in space, about its equilibrium position at the beam focus. A feedback loop supplies simultaneous heating and cooling signals representing respectively, amplification and cooling forces generated from the position detection information to an electro-optic modulator (EOM) that modulates the intensity of the trap beam to generate coherent motion of the mechanical oscillator. More specifically, the feedback loop supplies a heating signal which represents linear heating, which is an amplification force linear in the mechanical oscillator momentum, and a cooling signal which represents nonlinear cooling, which is a cooling force nonlinear in the mechanical oscillator variable position and linear in the momentum, to the EOM which modulates the intensity of the trap beam. The nonlinear cooling hinders the oscillator's motion by increasing the trap stiffness whenever the oscillator moves away from the trap center and reducing the trap stiffness whenever the oscillator falls back toward the trap. The linear heating amplifies the motion by decreasing the trap stiffness when the oscillator moves away from the trap center and increasing the trap stiffness when the oscillator returns to the trap center. The forces of heating and cooling are not equal except when the oscillator is at rest. Under the simultaneous action of the two types of feedback (amplification and cooling), the mechanical oscillation along a chosen direction of motion is modulated to generate laser-like coherent motion of the oscillator. The degree of coherence increases as the amplification feedback is increased and for large values of the amplification saturates to a coherence of one. This value of amplification feedback can be calculated from a theoretical model and can be checked by carrying out measurements on the displacement of the oscillator. Thus, the output can be monitored and the amplification feedback adjusted accordingly.

In an embodiment, the nonlinear cooling feedback circuit contains four sections. First a bandpass filter reduces the excess noise entering the feedback circuit. This is followed by a frequency doubler, a phase shifter to supply the appropriate feedback phase for cooling, and a variable gain amplifier. The linear heating feedback signal contains a phase-locked loop on a digital lock-in amplifier, which registers the phase and frequency of the oscillator's motion along a desired axis of the trap, and from which a signal of the same frequency is generated with a fixed phase relationship to the measured oscillator motion. This phase is set to induce heating of the oscillator motion. For sufficiently large heating, the oscillator motion becomes coherent. The values of the heating feedback required to produce the desired coherence can be found from a theoretical model which describes the experiment as well as deduced from measurements of the oscillator displacement.

Coherent mechanical vibrations are defined as those for which the normalized equal time energy-energy correlation function equals one.

A suitable mechanical oscillator for use in the present disclosure includes a physical substance capable of being optically levitated, such as the following non-limiting examples which include an electron, atom, molecule, nanoparticle, multiple nanoparticles in clusters, liquid droplet, as well as a small biological organism, such as viruses and bacteria.

The present disclosure relates to a method for modulating mechanical vibrations to produce coherence from an optically levitated mechanical oscillator by combining a trap beam with a probe beam to form a single collinear beam without interference between the two beams; focusing the single beam in a trap, levitating a mechanical oscillator in the trap beam and illuminating the mechanical oscillator with the probe beam; isolating the probe beam from the trap beam downstream from the trap; collecting the light from the isolated probe beam scattered by the mechanical oscillator and interfering the scattered light with unscattered light from the probe beam yielding position information of the mechanical oscillator; generating an amplification force linear in the mechanical oscillator momentum and a cooling force nonlinear in the mechanical oscillator variable position and linear in the momentum from the position information; simultaneously supplying an amplification signal and a cooling signal representing respectively the generated amplification force and cooling force to an electro-optic modulator; and modulating the intensity of the trap beam with the electro-optic modulator from the simultaneously supplied amplification signal and a cooling signal to generate coherent motion of the mechanical oscillator.

In an embodiment, the present phonon lasers do not involve for example, phonons arising from the interactions of oscillating atoms arranged in an array in a solid, as it relates to the center-of-mass oscillations of a single nanoparticle. These center-of-mass oscillations are delinked from the internal degrees of freedom of the nanoparticle, some of which involve phonons like in the solid state.

In an embodiment, the present disclosure provides a method of generating laser-like coherence for levitated mechanical oscillator systems. Further, it presents several advantages over prior technology in removing the constraints on all previous single oscillator phonon laser generation techniques by combining the i) ability to measure the position of the mechanical oscillator with ii) the ability to feed back in a specific way to modulate the spring constant of the oscillator. There is no need for using an optical cavity, or multiple modes of oscillation, or atoms with discrete energy structure.

The method combines simultaneous amplification and cooling feedback. The amplification force is linear, while the cooling force is nonlinear, in the oscillator variables. The amplification supplies the gain that a laser requires. It is due to the nonlinear nature of the cooling feedback that it is able to supply the saturable nonlinearity that the laser operation requires. The disclosure solves the problem of finding a source of coherent phonons at the mesoscopic scale. Such phonons are the required starting point for precision force sensing and engineering of quantum states for metrology.

The levitated oscillator is shielded very well from environmental influences and the apparatus is compatible with cryogenics and ultrahigh vacuum. Additional experimental controls such as charge, spin and rotation can readily be added to the system.

In an embodiment, a suitable system has three parts: i) an oscillator trapped at the focus of an optical beam. The beam is focused, for example, using high numerical aperture optical lenses. The oscillator oscillates harmonically along all three Cartesian directions in space, about its equilibrium position at the beam focus. Collinear with the trapping beam, but polarized orthogonally to it, is a probe beam; ii) a detector which collects the light scattered from the probe beam by the oscillator and interferes it with the unscattered light. This interference or homodyne measurement yields the displacement of the oscillator, as it oscillates, along all three directions; and iii) a feedback loop which generates signals generated from the detection information acquired in step ii) above to supply to an electro-optic modulator (EOM) that modulates the intensity of the trapping beam.

In an embodiment, a suitable single-beam optical tweezer phonon laser includes a trap beam; a probe beam collinear with and polarized orthogonally to the trap beam; an electro-optic modulator controlling the intensity of the trap beam; a first polarizing beam splitter; a second polarizing beam splitter; a first high numerical aperture focusing lens; a second high numerical aperture focusing lens; a particle trap disposed between the lenses, wherein the lenses are disposed between the beam splitters and the lenses, beam splitters and trap are in optical alignment with the trap beam; a detector in optical communication with the orthogonally polarized probe beam; a beam dump downstream of the beam splitters and collinear with the trap beam; and a feedback loop in electrical communication with the electro-optic modulator and the detector, wherein the feedback loop simultaneously supplies heating and cooling signals generated from position information of a particle within the particle trap from the detector to the electro-optic modulator which modulates the intensity of the trap beam.

Two types of feedback are simultaneously supplied to the EOM. One is an amplification force linear in the oscillator momentum. The other is a cooling force, nonlinear in the oscillator variable position and linear in the momentum. Under the action of the two types of feedback (amplification and cooling) described above, the mechanical oscillation of the oscillator along a chosen direction of motion exhibits the same dynamics as a single mode optical laser. The amplification feedback provides the gain, and the cooling feedback provides the saturable nonlinearity typically associated with the operation of an optical laser. Specifically, the motion of the oscillator shows the following laser-like characteristics: i) a threshold in its oscillation energy as a function of gain; ii) exponential increase in coherent oscillation amplitude above the threshold; iii) saturation in the oscillation energy due to the presence of a tunable nonlinearity; iv) linewidth narrowing across the threshold; and v) coherence in the oscillation energy measured by an autocorrelation of close to 1.

In an embodiment, the quality of oscillation of the mechanical oscillator can be improved by placing the tweezer under moderate vacuum, for example in a range of from approximately $10^{-4}$ mbar to $10^{-7}$ mbar.

Suitable optical power in the trapping beam includes a range of from approximately 80 mW to 120 mW and suitable optical power in the probe beam includes a range of from approximately 5 mW to 10 mW.

A major use of the system for near-term applications is foreseen as a force sensor. There are several ways in which the system can be used as a force sensor. The first possibility is via shift of oscillation frequency due to an external force. The linewidth far above threshold is 0.1 Hz, and therefore extremely narrow. The second possibility is via the nonlinear response of the laser across its threshold. The standard paradigm for force sensing using mechanical oscillators is in recording the change in the linear response of the oscillator after a force is applied on it. In contrast, the present system would rely on preparing the laser just below threshold. Application of a weak force would drive it across threshold, registering a nonlinear and large response.

Typically force sensitivities of the disclosure are $$\frac{10^{-21} N}{\sqrt{Hz}},$$

which would enable precision sensing of weak electric and magnetic fields. The system is better suited than atom-based sensors, for example, for detecting weak gravitational fields as an oscillator such as a nanoparticle has a much larger mass (~$10^9$ amu) and couples more strongly to gravity.

A slightly longer-term application involves exploiting, for example, two mechanical modes of nanoparticle oscillation and realizing coherent nanoparticle rotation. This realization could be used for rotation sensing and gyroscopy.

A long-term set of applications is related to the increasing importance of quantum mechanics-based technologies. It involves use of the system as a source of coherent phonons at the mesoscale (i.e., for particles of mass $10^9$ amu). By starting with this source, and using available mechanical nonlinearities, nonclassical states of mechanical motion can be engineered (such as Schrodinger cat states) which are important for metrology, quantum information processing as well as for probing the nature of decoherence, which is a major roadblock in the path of any quantum technology.

Another possible application is for exploring the role played by coherence in liquids and small biological organisms. Both liquid droplets as well as small biological organisms can be levitated using existing technology. The present system makes it possible, in principle, to examine the role played by quantum physics in biology, which is a growing topic of scientific interest in the context of bird migration and light harvesting in photosynthesis.

The present technology can possibly be used as a: i) force sensor; ii) mass (biomolecule/rare gases) sensor; iii) temperature sensor; iv) clock for metrology in the sub-MHz regime; v) a reference oscillator; vi) as a component of an on-chip photonic-phononic interface; or vii) inertial sensor.

The disclosure will be further illustrated with reference to the following specific examples. It is understood that these examples are given by way of illustration and are not meant to limit the disclosure or the claims to follow.

Example 1

Measurements of higher order correlations of coherent mechanical motion were carried out for an optical tweezer phonon laser, consisting of a silica nanosphere trapped in vacuum ($6\times10^{-5}$ mbar) by a tightly focused optical beam. All correlations were obtained by measuring the displacement of the nanosphere using a probe beam.

Figure 1:
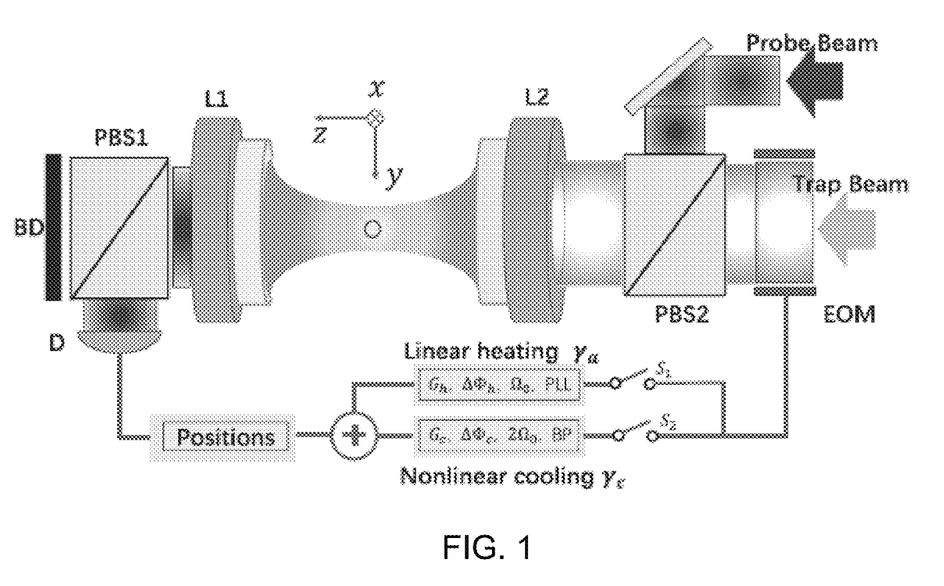
FIG. 1 is a schematic of an optical tweezer phonon laser in accordance an embodiment of the present disclosure.

An experimental apparatus illustrated in FIG. 1 was constructed around a free-space optical dipole trap inside a vacuum chamber. The system includes an electro-optic modulator (EOM), polarizing beam splitters (PBS1 and PBS2), high numerical aperture focusing lenses (L1 and L2), a detector (D), two switches ($S_1$ and $S_2$) and a beam dump (BD). A nanoparticle is optically trapped by the single-beam optical tweezer, and its position measured using a probe beam. The particle is addressed with nonlinear feedback cooling ($\gamma_c$) and linear feedback amplification ($\gamma_a$); associated with this measurement and feedback are also backactions ($r_c$ and $r_a$) in this system. For the feedback cooling and heating, BP, $2\Omega_0$, $\Delta\Phi$, $G_{h(c)}$, and PLL denote the electronic bandpass filter, frequency doubler, phase shifter, electronic gain for heating (cooling), and phase-locked loop, respectively.

Trapping of subwavelength diameter silica spheres is achieved by tightly focusing a linearly polarized beam of wavelength 1064 nm (Coherent Mephisto, linewidth <1 kHz) using a microscope objective with a 0.80 numerical aperture (Nikon CFI LU Plan FLUOR). The trapping beam is polarized along the y axis of the trap. The mean optical power in the trapping beam is controlled by the bias voltage on an electro-optic modulator (Conoptics M360) in series with a linear polarizer. This same electro-optic modulator also actuates the feedback via the control electronics by inducing modulation of the trapping beam power. A weak probing beam from the same source laser is aligned coincident with the trapping beam. The probe has an orthogonal polarization along the x axis of the trap and is frequency shifted 80 MHz by an acousto-optic modulator to be well outside the lineshape of the trapping beam, thus minimizing interference between the two. Forward-traveling light from the trap is collected by an aspheric lens and sent out of the chamber. The probing beam is then filtered from the trapping beam and used to monitor the full three-dimensional center-of-mass position of the trapped nanoparticle by performing homodyne measurements on a series of balanced photodiodes (ThorLabs PBD425C).

Nonlinear cooling is provided by a series of homebuilt analog electronics that take the measured center-of-mass position signal as an input and output the desired feedback signal. The circuits include four stages: a bandpass filter to reduce excess noise entering the feedback circuit (passband 10-400 kHz), a frequency doubler, a phase shifter to supply the appropriate feedback phase for cooling, and a variable gain amplifier. This feedback loop is used to cool the trapped particle's motion in all three spatial degrees of freedom by supplying a modulation signal $\propto q_i q'_i$, where $q_i$ represents the particle's position along the ith Cartesian axis and the dot denotes a time derivative. The form of this feedback signal results from the frequency doubling stage, which employs the integrated circuit AD734. This results in nonlinear dynamics of the oscillator's phonon occupation.

The linear heating feedback signal is derived from a phase-locked loop (PLL) on a digital lock-in amplifier (Zurich Instruments HF2LI). The PLL tracks the phase and frequency of the particle's motion along a desired axis of the trap, and from the PLL a signal of the same frequency can be generated with a fixed phase relationship to the measured particle motion. The phase of the generated signal is set to induce heating of the particle's motion, and the ultimate output amplitude can be set to the desired value. Deriving the heating signal from a PLL produces a free-running oscillator that is not locked to any fixed external phase reference. This signal only addresses a single spatial degree of freedom of the particle's motion in this experiment but can be expanded upon to address multiple degrees of freedom if desired.

A switch placed after the output of the linear heating feedback system (Minicircuits ZASWA-2-50DR+), that can be toggled by application of a TTL pulse, allows the amplifying signal to be switched on and off in the experiments exploring oscillator dynamics. This switch could be toggled with a rise-time on the order of 5 ns, which is much shorter than the characteristic time scales observed in these experiments. After periods of amplification, the gain would be switched off and the oscillator allowed to cool under the influence of the feedback cooling loop for 500 ms, which is over 10 times longer than typical relaxation times for this oscillator to reach it's cooled steady state. All feedback signals are then summed together and delivered to the electro-optic modulator to actuate the feedback.

Figure 2A:
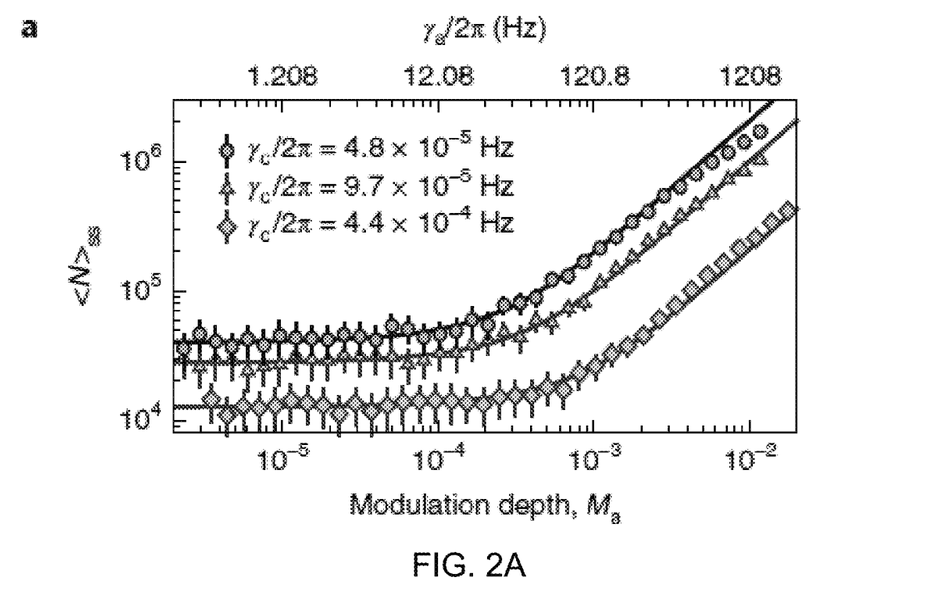
FIG. 2A is a graph of the mean phonon population of the oscillation as a function of the amplification modulation depth.
Figure 2B:
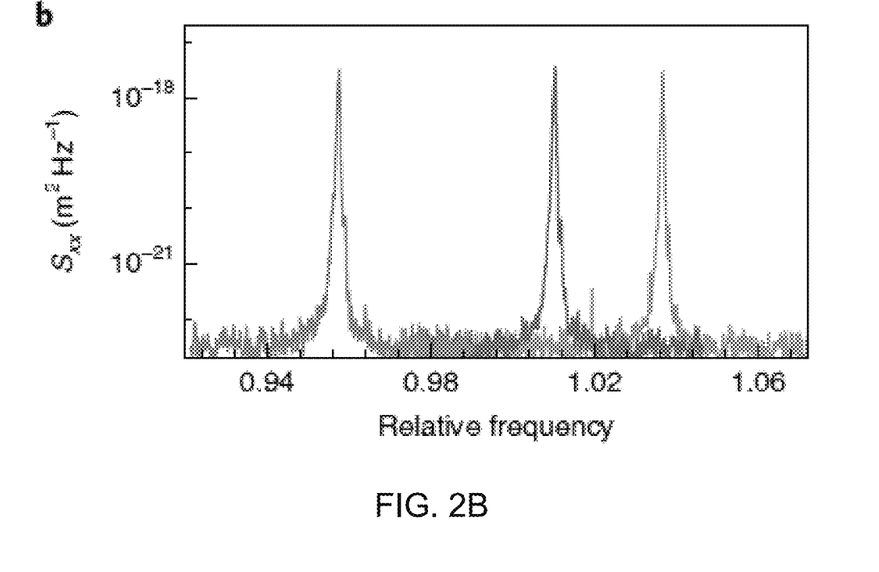
FIG. 2B is a graph showing tuning of the single-mode phonon laser frequency.
Figure 2C:
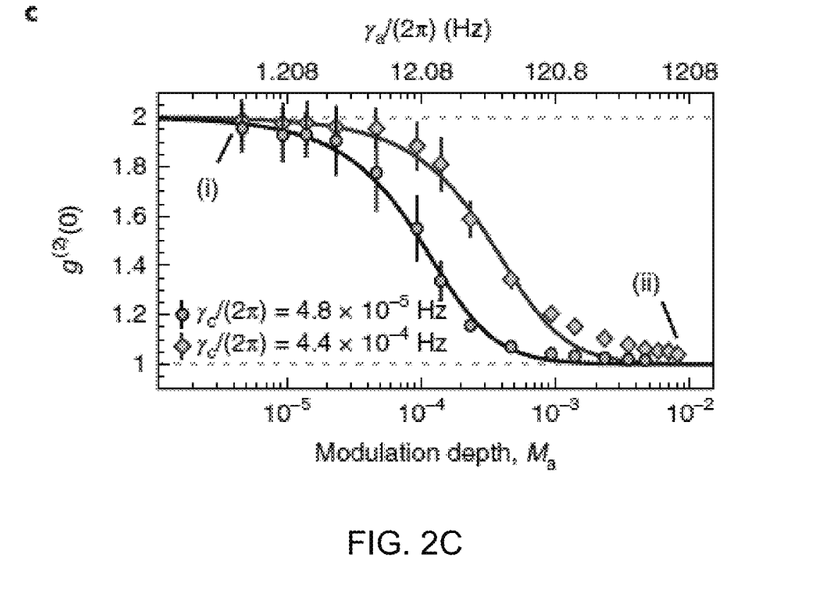
Figure 2D:
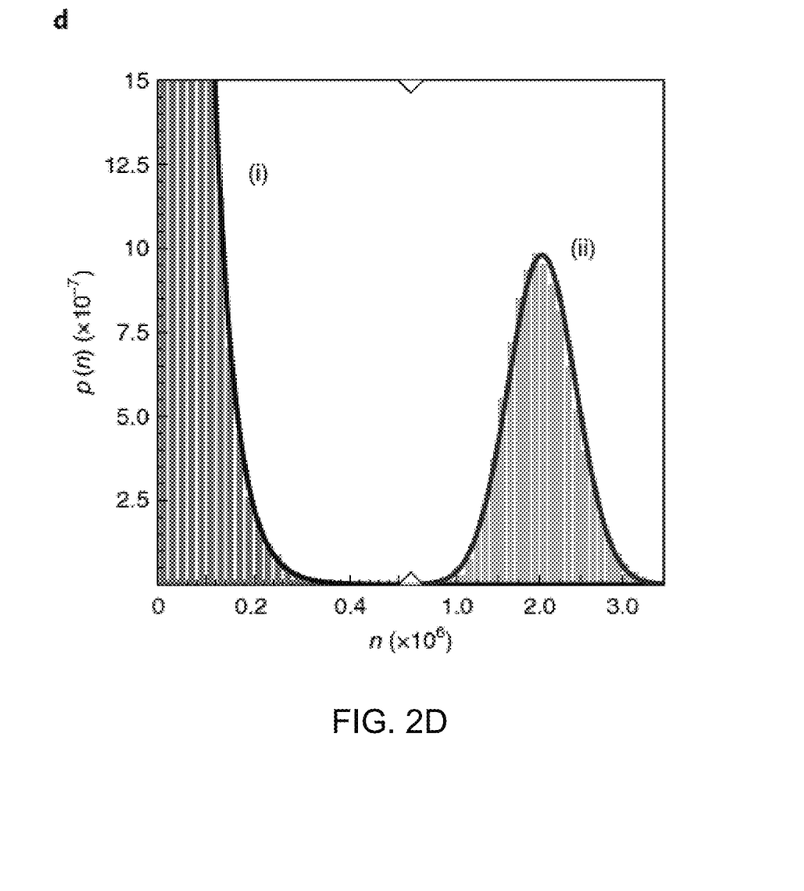
FIG. 2D is a graph showing phonon probability distributions.
Figure 2E:
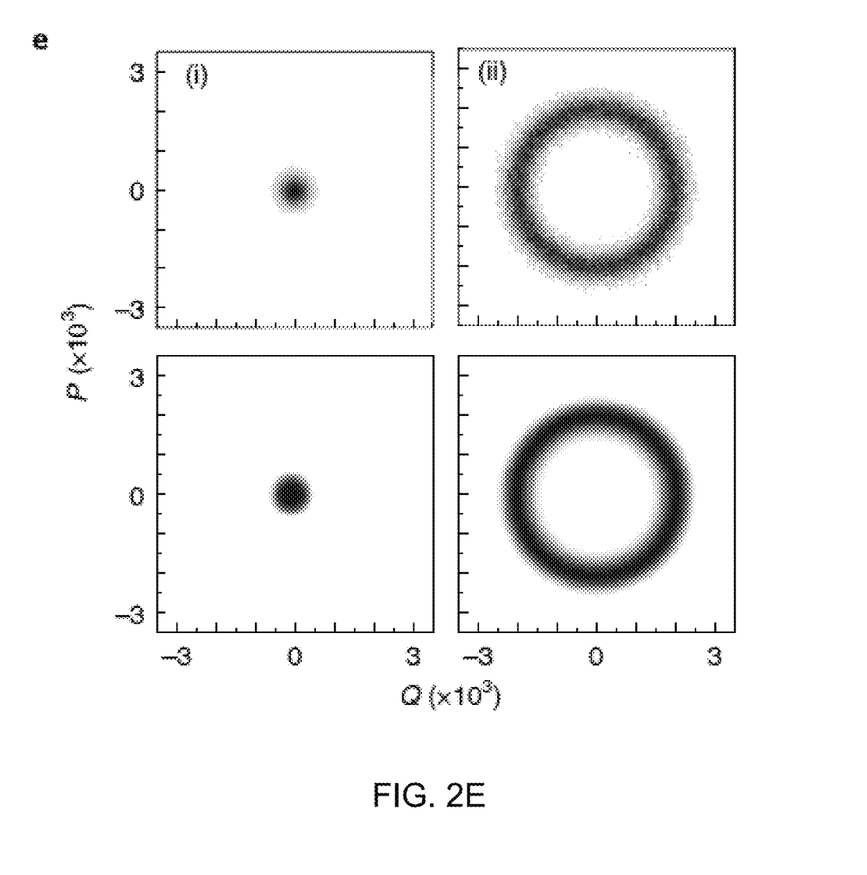
FIG. 2E shows a comparison of experimentally measured quadratures of the oscillator's motion with theoretically expected phase-space distribution.

FIGS. 2A-2E represent steady state properties. Threshold behavior is demonstrated in FIG. 2A by increasing the modulation depth of the amplification feedback signal $M_a = \delta P_a / P_0$, where $P_0$ is the power of the trapping beam and $\delta P_a$ is the power modulation induced by the feedback amplification, for various set values of $\gamma_c$ at a constant pressure of $6\times10^{-5}$ mbar (gas scattering dominates over radiation pressure shot noise). The mean phonon population of the oscillation as a function of the amplifying modulation depth, $M_a$, for different values of the feedback cooling rate, $\gamma_c$. Solid lines are theoretical expectations. Error bars represent one standard deviation (s.d.) of each measurement, consisting of 282,700 samples. FIG. 2B shows in situ tuning of the single-mode phonon laser frequency, normalized by the mean of the two outlying spectra. Optical powers considered are 72 mW, 80 mW and 85 mW. FIG. 2C shows second-order phonon autocorrelation function at zero delay, $g^{(2)}(0)$, as $M_a$ is increased across the threshold for two different values of the feedback cooling rate, $\gamma_c$. Error bars represent s.d. from 100 measurements. The dotted lines at $g^{(2)}(0)=2$ and 1 indicate the expected values for a thermal state and a coherent state, respectively, while the solid lines are theoretical expectations. Markers (i) and (ii) indicate values of $M_a$ where the oscillator is below and above threshold, respectively. FIG. 2D presents two of the measured phonon probability distributions used in FIG. 2C. Phonon probability distributions for the selected values of $M_a$. Solid lines are theoretical expectations. The horizontal axis is split to better show both distributions. For the same cases (i) and (ii) the steady-state phase-space distributions of the oscillator were examined in FIG. 2E by measuring the in-phase and quadrature components of the oscillator's motion with a lock-in amplifier. Comparison of experimentally measured quadratures of the oscillator's motion (top) with theoretically expected phase-space distribution based on the P-function (bottom) for the selected values of $M_a$. A phase transition between (i) Brownian motion and (ii) coherent oscillation is evident.

Figure 3A:
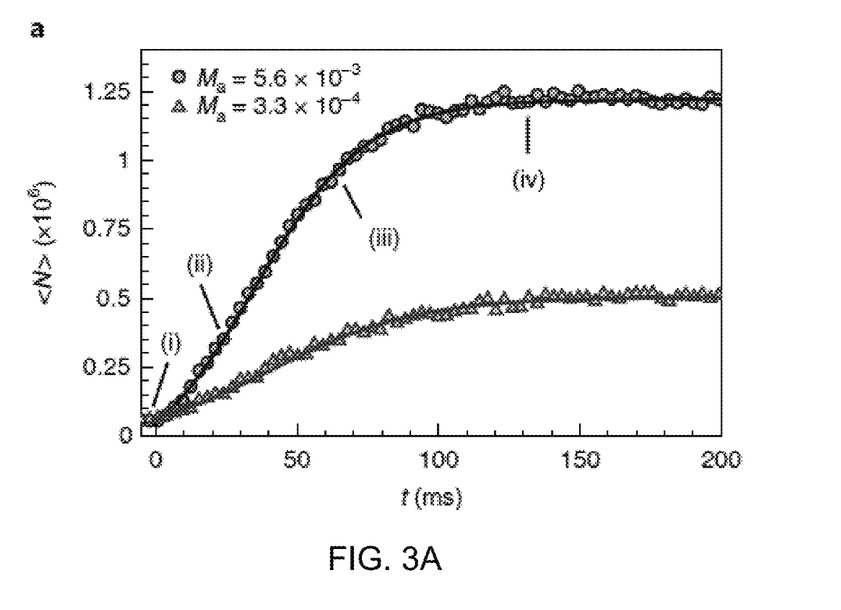
FIG. 3A is a graph of the mean phonon population as a function of time and FIG. 3B is a graph showing phonon probability distributions.
Figure 3B:
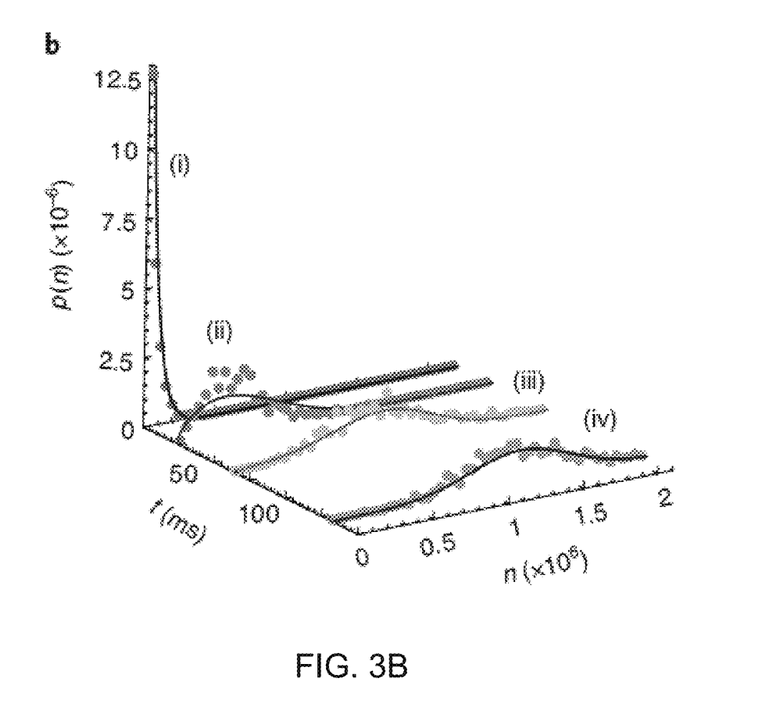

FIG. 3A shows transient behavior after the linear gain is switched on along the trap's x axis. After a period of amplification, the gain was switched off and the oscillator was allowed to cool under the influence of the feedback cooling loop to reinitialize the state of the particle. Mean phonon population is monitored in time for two different values of $M_a$, calculated from 500 experimental iterations of the switching experiment in which the linear gain is switched on at time t=0. Solid curves are theoretical expectations and the markers indicate the system's evolution at (i) 0 ms, (ii) 23.7 ms, (iii) 62.2 ms and (iv) 130.5 ms from the time the gain was switched on. FIG. 3B shows evolution of the oscillator's phonon probability distribution shown for the selected times. Solid curves are theoretical expectations.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A single-beam optical tweezer phonon laser comprising:
    a trap beam and a probe beam in optical communication with a first polarizing beam splitter configured to provide a single collinear beam without interference between the trap beam and probe beam;
    a second polarizing beam splitter configured to isolate the probe beam from the trap beam;
    a first focusing lens;
    a second focusing lens;
    a mechanical oscillator trap disposed between the first and second focusing lenses, wherein the lenses are disposed between the beam splitters, and the lenses, beam splitters and trap are in optical alignment with the single beam;
    a beam dump downstream of the beam splitters and in optical alignment with the trap beam;
    a detector in optical communication with the isolated probe beam configured to provide position information of a mechanical oscillator levitated within the mechanical oscillator trap;
    an electro-optic modulator controlling the intensity of the trap beam; and
    a feedback loop in electrical communication with the electro-optic modulator and the detector, wherein the feedback loop is configured to simultaneously supply an amplification signal and a cooling signal representing respectively an amplification force linear in the mechanical oscillator momentum and a cooling force nonlinear in the mechanical oscillator variable position and linear in the momentum generated from the position information to the electro-optic modulator to generate coherent motion of the mechanical oscillator.

2. The phonon laser of claim 1, wherein the mechanical oscillator is an electron, atom, molecule, nanoparticle, cluster of nanoparticles, liquid droplet, or biological organism.

3. The phonon laser of claim 1, wherein the mechanical oscillator trap is under a vacuum.

4. A method for modulating mechanical vibrations to produce coherence from an optically levitated mechanical oscillator, comprising:
    combining a trap beam with a probe beam to form a single collinear beam without interference between the trap beam and the probe beam;
    focusing the single beam in a trap, levitating a mechanical oscillator in the trap beam and illuminating the mechanical oscillator with the probe beam;
    isolating the probe beam from the trap beam downstream from the trap;
    collecting light from the isolated probe beam scattered by the mechanical oscillator and interfering the scattered light with unscattered light from the probe beam yielding position information of the mechanical oscillator;
    generating an amplification force linear in the mechanical oscillator momentum and a cooling force nonlinear in the mechanical oscillator variable position and linear in the momentum from the position information;
    simultaneously supplying an amplification signal and a cooling signal representing the generated amplification force and cooling force to an electro-optic modulator; and
    modulating the intensity of the trap beam with the electro-optic modulator from the simultaneously supplied amplification signal and a cooling signal to generate coherent motion of the mechanical oscillator.

5. The method of claim 4, wherein the mechanical oscillator is an electron, atom, molecule, nanoparticle, cluster of nanoparticles, liquid droplet, or biological organism.

6. The method of claim 4, further comprising applying a vacuum to the mechanical oscillator trap.

* * * * *